(12) United States Patent
  Sabeta

(10) Patent No.: US 8,628,194 B2
(45) Date of Patent: Jan. 14, 2014

(54) METHOD AND SYSTEM FOR CONTACT LENS CARE AND COMPLIANCE

(76) Inventor: Anton Sabeta, Toronto (CA)

( * ) Notice: Subject to any disclaimer, the term of this patent is extended or adjusted under 35 U.S.C. 154(b) by 749 days.

(21) Appl. No.: 12/758,058

(22) Filed: Apr. 12, 2010

(65) Prior Publication Data

US 2011/0084834 A1     Apr. 14, 2011

Related U.S. Application Data

(63) Continuation-in-part of application No. 12/578,564, filed on Oct. 13, 2009.

(51) Int. Cl.
  *G02C 7/02* (2006.01)

(52) U.S. Cl.
  USPC ...................................... 351/159.01; 351/246

(58) Field of Classification Search
  USPC ............. 351/159.01, 159.02, 159.24, 159.28, 351/159.73, 246, 247
  See application file for complete search history.

(56) References Cited

U.S. PATENT DOCUMENTS 5,159,360 A * 10/1992 Stoy et al. ................ 351/159.33
2004/0180391 A1* 9/2004 Gratzl et al. .................... 435/14

* cited by examiner

*Primary Examiner* — James Greece

(57) ABSTRACT

A method for tracking ophthalmic lens care compliance, said method comprising the steps of: including at least one sensor with said ophthalmic product for monitoring at least one ambient condition and for logging and recording at least one reading associated said at least one ambient condition, following a predetermined event; determining whether said at least one reading exceeds at least one predetermined threshold, and issuing an alert when said at least one reading exceeds at least one predetermined threshold.

20 Claims, 5 Drawing Sheets

METHOD AND SYSTEM FOR CONTACT LENS CARE AND COMPLIANCE

CROSS-REFERENCE TO RELATED APPLICATIONS

This application is a Continuation-in-Part of, and claims the benefit from U.S. application Ser. No. 12/578,564, filed on 13 Oct. 2009.

BACKGROUND OF THE INVENTION

1. Field of Invention

The present invention relates to a method and system for promoting contact lens care compliance.

2. Description of the Related Art

The contact lens market in the United States is a multi-billion dollar market. Recent data indicates that nearly 36 million Americans, almost 13% of the US population, wear contact lenses. There are numerous manufacturers of contact lenses and many different channels of distribution, including eye care practitioners (e.g. ophthalmologists and optometrists), national and regional optical chains, mass merchants, and mail order and online stores. The contact lenses include any of the following basic types: soft, rigid gas permeable and hard. Soft contact lenses are made of a highly flexible material such as a plastic hydrogel polymer, hydroxyethyl methacrylate (HEMA) that contains water or silicone or hydrophilic hydrogels. Rigid gas permeable contact lenses, frequently referred to as RGP contact lenses, are composed of a firm plastic material and do not contain water. RGP lenses permit oxygen to pass directly through the lens to the eye, thus these lenses are gas permeable. In contrast, hard contact lenses are made of a hard plastic material, such as polymethyl methylacrylate (PMMA), which does not allow oxygen to pass through the lens to the eye.

In most countries, contact lenses are classified as medical devices, and are thus normally only dispensed with a valid prescription from a qualified eyecare practitioner. A valid prescription typically includes user's name, eye practitioner's name, contact lens brand name and material, lens measurements such as power, diameter and base curve, directions for safe use such as wearing schedule, whether lenses are for daily or extended wear, the number of refills, whether lens material substitutions are allowed and an expiration date. Generally, the quality of human vision worsens with age, or due to reasons independent of aging or eye diseases. Some of the changes in eyes are reduction in pupil size and the loss of accommodation or focusing capability, or presbyopia. As such, prescriptions typically have an expiration date, and thus should be updated periodically. Each lens manufacturer has a replacement schedule of a contact lens, that is, how long the lenses can be safely worn before discarding. The replacement schedule depends on the patient, manufacturer or the type of lens chosen.

For example, RGPs last several years, while soft contact lenses come in a wider variety of replacement schedules: daily disposable—1 day, disposable (extended wear)—1 week to 1 month, disposable (daily wear)—2 weeks, frequent replacement (also called "planned replacement"), 1 month to several months, conventional 1-year, depending on brand. Generally, hard contact lenses are available for different wear schedules, such as daily wear, and extended wear or overnight wear. Also, with planned-replacement lenses, an eye care practitioner works out a replacement schedule tailored to each user's needs. For example, for users who produce a higher level of protein in their eyes or do not take as good care of their lenses, it might be healthier to replace the lenses more frequently. Therefore, the onus to keep track of the wearable life of the lenses falls on the user. As such, if a user does not record the date of first use, or subsequent usage, as time passes it can become difficult to recall how long a particular pair of contact lenses has been worn.

Despite recommendations by eye care practitioners to replace lenses as specified in the prescriptions, most users continue to use these lens well past the expiration date or replacement date, whether unwittingly or otherwise. Such practices present a serious safety concern with contact lenses. Extended wear of contact lenses, rigid or soft, beyond the replacement schedule or wear schedule, increases the risk of corneal ulcers, infection-caused eruptions on the cornea that can lead to blindness. Symptoms include vision changes, eye redness, eye discomfort or pain, and excessive tearing. Another sight-threatening concern is the infection Acanthamoeba keratitis, caused by improper lens care. This difficult-to-treat parasitic infection's symptoms are similar to those of corneal ulcers. Several solutions for tracking the wearable life of a contact lens have been presented in the prior art, however these solutions place the onus of tracking the day-to-day wear of the lenses on the user, and are prone to error.

It is thus one of the objects of this invention to mitigate or obviate at least one of the aforementioned disadvantages.

SUMMARY OF THE INVENTION

In one of its aspects the present invention provides a method and system for tracking the life or age of an optical device, the method comprising the steps of: providing the optical device with data carrier means for carrying data related to the optical device, the data carrier having data carrier means operable in at least one of an electrical mode and a magnetic mode; providing an activation signal from an external means; activating the data carrier means with the activation signal to cause the data carrier means to emit the data in response to the activating signal; recording the time the data carrier means is interrogated; and processing the received data to determine the age or wearable life, or useful life, of the optical device based on the time of the activation signal and a predetermined time as a reference or milestone.

In another of its aspects the present invention provides a method for tracking ophthalmic lens care compliance, said method comprising the steps of: including at least one sensor with said ophthalmic product for monitoring at least one ambient condition and for logging and recording at least one reading associated said at least one ambient condition, following a predetermined event; determining whether said at least one reading exceeds at least one predetermined threshold, said at least one predetermined threshold corresponding to said at least one ambient condition, issuing an alert when said at least one reading exceeds at least one predetermined threshold.

In another of its aspects the present invention provides a method for tracking ophthalmic lens care compliance, said method comprising the steps of: including at least one sensor with a contact lens container for monitoring at least one ambient condition and for logging and recording at least one reading associated said at least one ambient condition, following a predetermined event; comparing said at least one reading to a predetermined threshold and providing an outcome, said predetermined threshold corresponding to said at least one ambient condition, issuing an alert based on said outcome.

Advantageously, the method and system promote contact lens compliance, thus significantly diminishing complications associated with non-compliance.

BRIEF DESCRIPTION OF THE DRAWINGS

These and other features of the exemplary embodiments of the present invention will become more apparent in the following detailed description in which reference is made to the appended drawings wherein.

DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
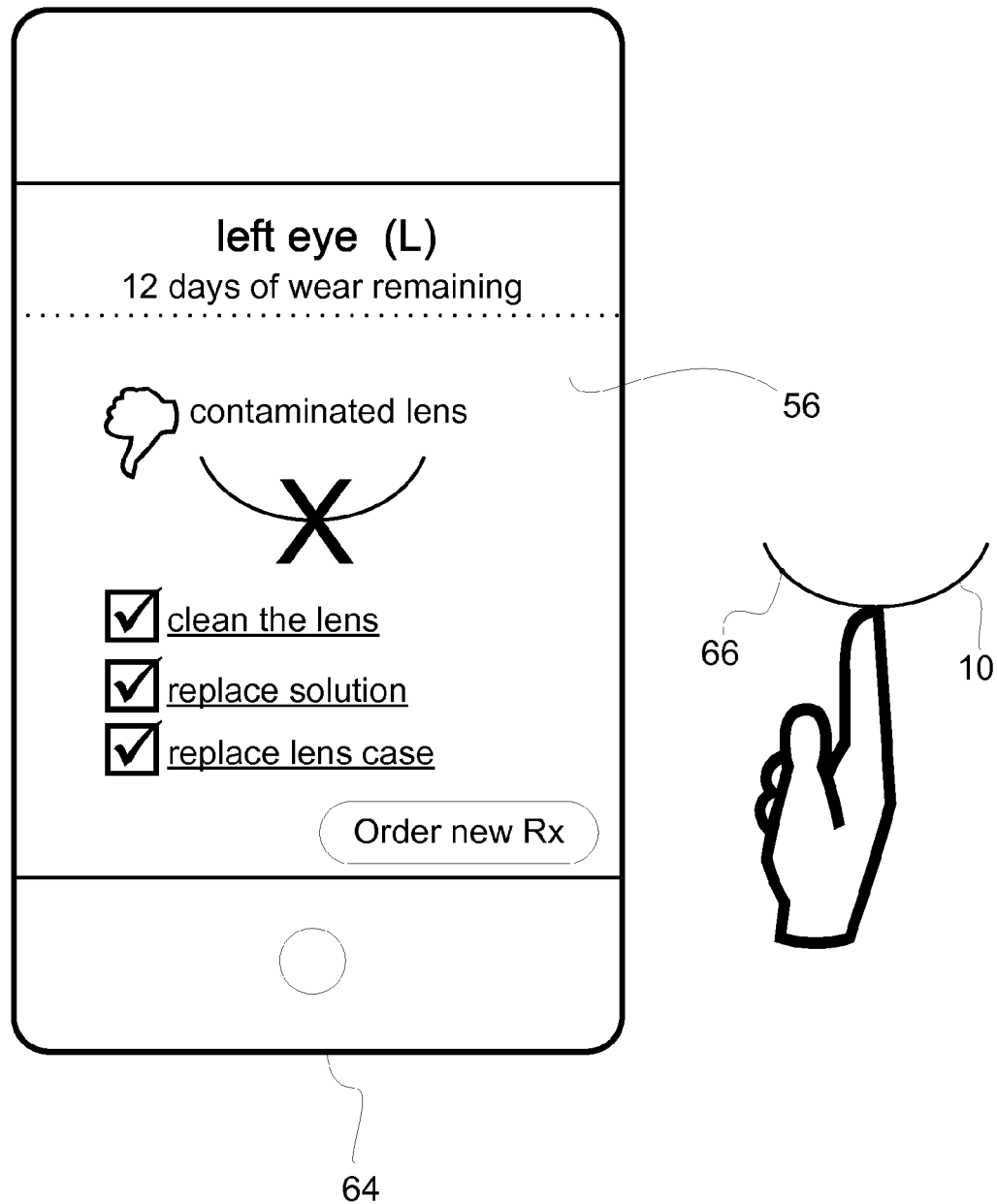
FIG. 1 depicts a schematic of an exemplary system for contact lens compliance.
Figure 3:
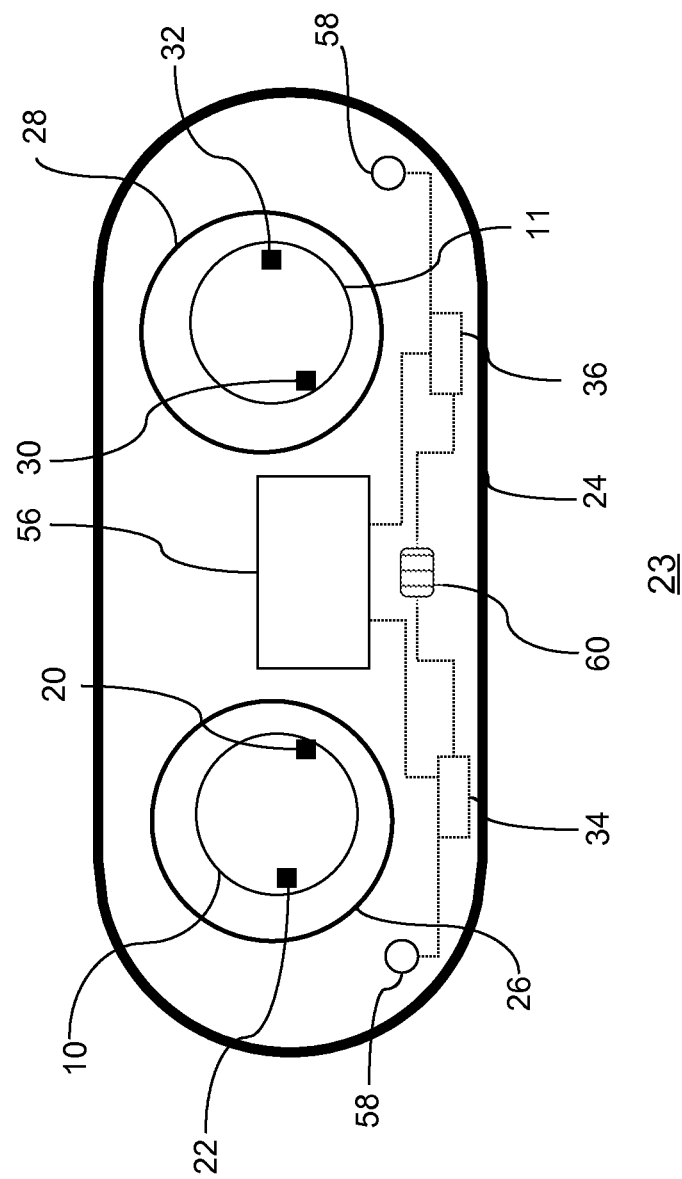
FIG. 3 depicts a schematic of an exemplary system for contact lens compliance.

Referring to FIGS. 1 and 3 there is shown a system 23 for ophthalmic device compliance. The ophthalmic device 10, as disclosed in the exemplary embodiments, includes, but is not limited to, ophthalmic lenses, soft contact lenses, hard contact lenses, bifocal contact lenses, multi-focal contact lenses, colored contact lenses, disposable contact lenses, extended wear contact lenses, gas permeable (GP) contact lenses, rigid gas permeable (RGP) contact lenses, monovision lenses, orthokeratology lenses, prosthetic contact lenses, silicone hydrogel contact lenses, special-effect contact lenses, specialty lenses, toric contact lenses, bi-toric contact lenses, aspherics, lenticulars, spheres, intraocular lenses or implantable collammer lenses (ICL), cosmetic lenses, overlay lenses and onlay lenses. As used herein, 'compliance' is defined as 'the process of complying with a regimen of treatment'. In the context of contact lens wear, this can be interpreted as a wearer correctly adhering to the instructions provided by the contact lens practitioner with respect to optimum lens wear and care.

Figure 2:
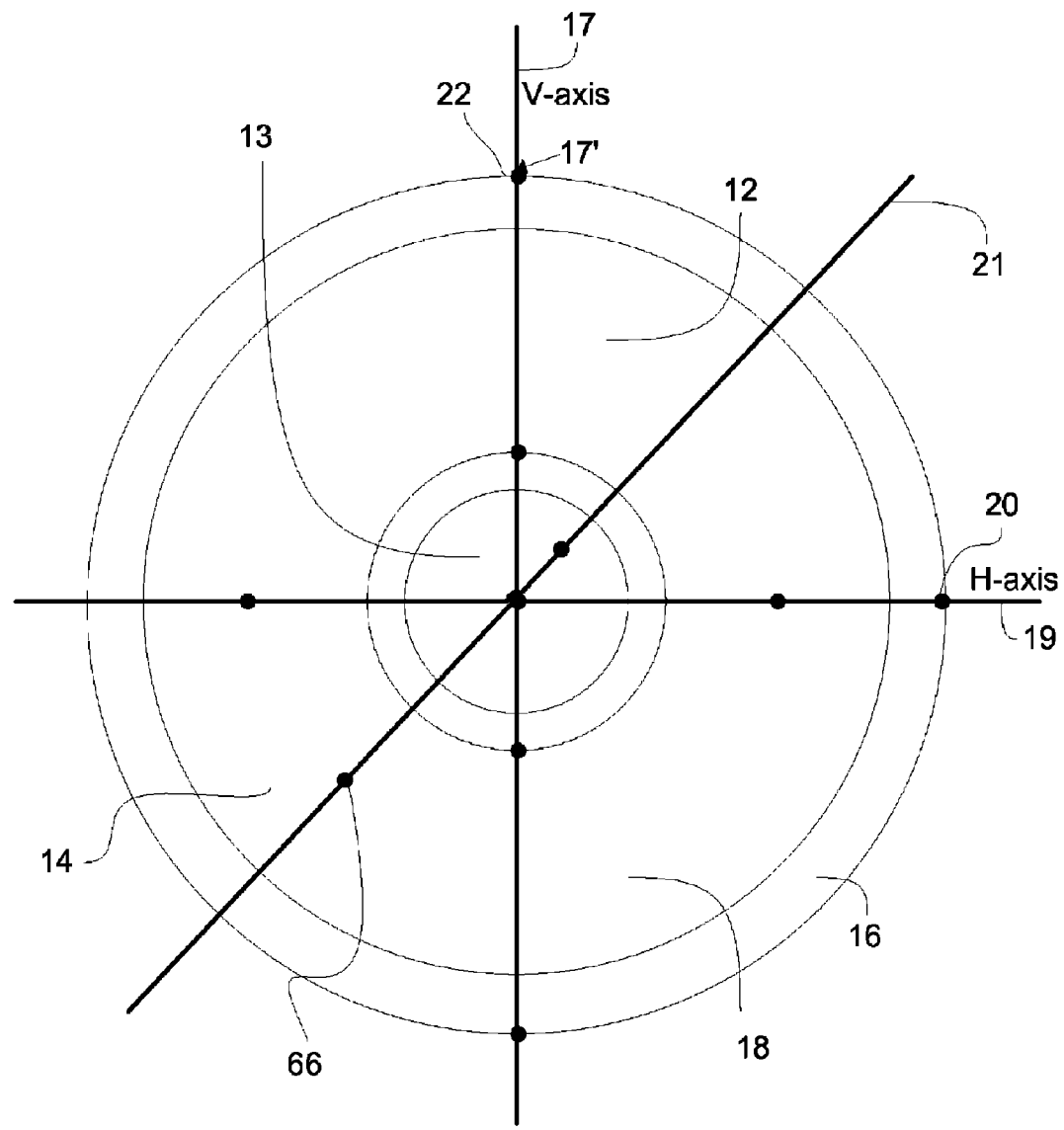
FIG. 2 depicts a schematic of an exemplary contact lens.

As depicted in FIG. 2, an exemplary ophthalmic device 10, such as a contact lens, comprises an anterior surface 12, an opposing posterior surface 14 surrounded by a peripheral edge 16, an edge surface (not shown), such as a spherical lens formed from surfaces 12, 14 which have a spherical curvature. The contact lens 10 also includes an optical zone 13 surrounded by a peripheral zone 18. The contact lens 10 can comprise any known material useful for making contact lenses, which may include, but is not limited to HEMA, POLYMACON, METAPHILCON A, HEMA 38 (TEFILCON), POLYHEMA, CROFILCON A, IIEMFILCON A, IIEMA 38 (TEFILCON) PHEMFILCON A, TETRAFILCON A, 41% OMAFILCON A, HEMA-GMMA, MODIFIED HEMA, PMMA, BENZ x-3, BENZ METAPHILCON, HEFILCON B, CROFILCON A, TEFILCON, SYNERGICON A, HEMA-VINYL METHACRYL, HEMA-VP, XYLOFILCON A, DL 77, HIOXIFILCON A, BOSTON ES, BOSTON XO, BOSTON ES, SILPERM 50, FSA, PARAGON DK 60, FLUOROSILICONE ACRYLATE, SILOXANE-FLUOROCARBON ACRYLATE, HILAFILCON B, BALAFILCON A, ALPHAFILCON A, METHAFILCON A, NELFICON A, VIFILCON A, VASURFILCON A, OCUFILCON B, ETAFILCON A, GALYFILCON, and SENOFILCON A, galyfilcon A, senofilcon A, genfilcon A, lenefilcon A, comfilcon A, acquafilcon A, balafilcon A, lotrafilcon A, narafilcon A, and silicone hydrogels.

The lens 10 includes at least one data carrier 20 on any surface of the lens 10, such as the anterior surface 12, the posterior surface 14, or the edge surface (not shown) extending between the anterior surface 12 and the posterior surface 14. The data carrier 20 may be any suitable means for retaining data operable in an electrical and/or magnetic mode, such as a radio identification device or RFID tag, as implemented in an exemplary embodiment of the present invention. For example, each of the tags 20 can be implemented as a passive tag, an active tag, or a semi-passive tag. Those skilled in the art will recognize that active, semi-passive tags, or passive tags share many features and that can be used with this invention. In this specification, for clarity of usage, the term 'tag' is used to refer generally to all RFID devices.

Generally, RFID systems use a variety of techniques to transmit data to and from the tag. For transmission to the tag, the data can be transmitted using any of a variety of modulation techniques including, but not limited to, amplitude modulation (AM), phase modulation (PM), and frequency modulation (FM). Furthermore, the data transmitted to the tag can be encoded using any of a variety of techniques, including frequency shift keying (FSK), pulse position modulation (PPM), pulse duration modulation (PDM) and amplitude shift keying (ASK). In general, passive tags have no battery or internal power source, and operate by back-scattering or load modulation of an incident RF signal, which may be transmitted by one of the Although some types of passive tags can store energy for a period of time, passive tags typically require continuous input power as an energy source. Active tags generally include an internal power source such as a battery, photovoltaics, or any other suitable type of power source, such as an energy scavenging device. Exemplary energy scavenging devices include devices that source energy from the environment, such as radiation (solar, RF, and so forth), or photovoltaic energy, vibration spectra of office windows, copy machines, microwave ovens, industrial motors, freeway traffic, RF power, or human gait. Further, active tags can transmit RF signals automatically, or in response to a request or a command provided by a reader, on a predetermined schedule (e.g., every 10 seconds or every 300 seconds), or upon detection of a threshold event. This energy source permits active tag to create and transmit strong response signals even in regions where the interrogating radio frequency field is weak, and thus an active tag can be detected at greater range. Semi-passive tags are hybrids of passive and active tags, and are generally configured to provide improved read-range, data storage, sensor sophistication, level of security, etc., in comparison with purely passive tags.

The optical devices 10 are manufactured using any one of the above noted materials, and may be manufactured in accordance with methods known to those skilled in the art of the specific optic device being produced. For example, if an intraocular lens is to be produced, the same may be manufactured by methods known to those skilled in the art of intraocular lens production. Generally, among the known methods for soft contact lens manufacturing is spin casting, a method by which liquid monomer is injected into a spinning mold to create the desired lens shape, thickness and size. The monomer is distributed along the mold according to the centrifugal force, gravity and surface tension of the liquid. Slower rotations produce smaller diameters, thicker centers, flatter base curves and plus powers. The opposite is true for faster rotations. When the desired parameters are obtained, UV light is used to polymerize the monomer into a solid lens. The lens is then hydrated to its final state. Another method is lathe cutting is where a polymerized soft lens material in the rigid state is lathe cut similar to an RGP lens. After cutting and polishing the lenses, they go through a hydration stage that creates the final soft contact lens. The lens will have specific water content after hydration, depending on the polymer. Yet another method is cast molding, a method which requires two molds between which liquid lens material is injected, and the lens is kept in a liquid state throughout the manufacturing process. As such, a data carrier 20 can be included with the liquid monomer, or may be placed on one of the molds prior to introduction of the lens material such that the data carrier 20 is located on the anterior surface or posterior surface of the eventual lens 10. Preferably, the data carrier 20 is so positioned on the mold such that it is located at a predetermined location on the eventual lens 10. Alternatively, the data carrier 20 is included with the eventual lens at any appropriate point in the manufacturing process, or after the manufacturing process by any other suitable methods, as described above.

In another exemplary embodiment, the data carrier 20 includes devices manufactured using printable electronics technology, such as printed RFID ICs, or organic, chipless, polymer-based tags, or made with conductive inks that can store and transmit data. These tags 20 are produced with common commercial printing processes such as flexographic, rotogravure, offset or rotary screen using special inks and materials. A variety of electronic inks with conductive, insulating, or semiconductor qualities, are printed in successive layers on plastic substrates to form electronic circuits including organic field effect transistors (OFETs). The electronic inks may be opaque, or transparent and thus undetectable to the human eye, and are compatible with the particular contact lens material. In an exemplary method of developing and manufacturing complete RFID tags uses ink jet technology used to print silver fluid, or inks containing silver dispersions, with features of less than 20 microns. This technology can precision print 1 picoliter-sized drops of organic and inorganic materials on a large variety of substrates. The printable antenna and the circuit chip may be printed directly onto the suitable contact lens material, such that, at least one antenna and at least one circuit chip is electrically connected to the anterior surface, and/or the opposing posterior surface of the contact lens material. Alternatively, the antenna and the circuit chip may be printed onto a polymer film material, or other suitable carrier material, which is attached to the contact lens. Alternatively, active tags may include printable photovoltaics, or printable batteries. In yet another exemplary embodiment, the tag 20 is a magnetic tag, based on nanotechnology and microtechnology. The magnetic tag 20 includes certain materials which possess unique magnetic properties that permit individual items to be precisely identified.

FIG. 2 shows another exemplary system 23 for contact lens compliance. The system 23 comprises a container 24 for storing the pair of lenses 10 and 11. Disposed within a receptacle 26 of the container 24 is the contact lens 10, while the contact lens 11 is disposed within a receptacle 28, in a conventional manner. The container 24 has a substantially planar top surface and the receptacles 26, 28 are generally concave when viewed from the side of the container 24. The receptacles 26, 28 include a liquid medium, such as a solution which may be, but is not limited to, saline solutions, buffered solutions, deionized water, or any other suitable contact lens storing liquid or lens care solution, that is used for the sterilization and storage of contact lenses 10, 11. The lens 10 is prescribed for the user's left eye, hereinafter the left lens 10, includes at least one data carrier 20 or 22, and the lens 11 is prescribed for the user's right eye, hereinafter the right lens 11, with at least one data carrier 30 or 32. The system 23 also includes at least one external means, such as an interrogation unit or data carrier readers 34 and 36, which have the capability of reading data associated with the data carrier 20, 22, 30, or 32; or writing data to the data carrier 20, 22, 30, or 32. Thus, the data carrier 20, 22, 30, or 32 may be caused to emit data to a receiving unit 34 or 36 either periodically, automatically or in response to a request. For convenience, only the reader 34 will be discussed in operation with the tag 20, since this operation is similar to the interaction between the reader 34 and tag 22; and similar to the interaction between the reader 36 and tag 30, 32; and the readers 34 and 36 possess like elements, while tags 20, 22 and 30, 32 also possess like elements. Alternatively, the container 24 includes the only one reader 34 for determination of the characteristics of either lens 10 or 11, inherent in the data carrier 20, 22, 30, or 32.

Figure 4:
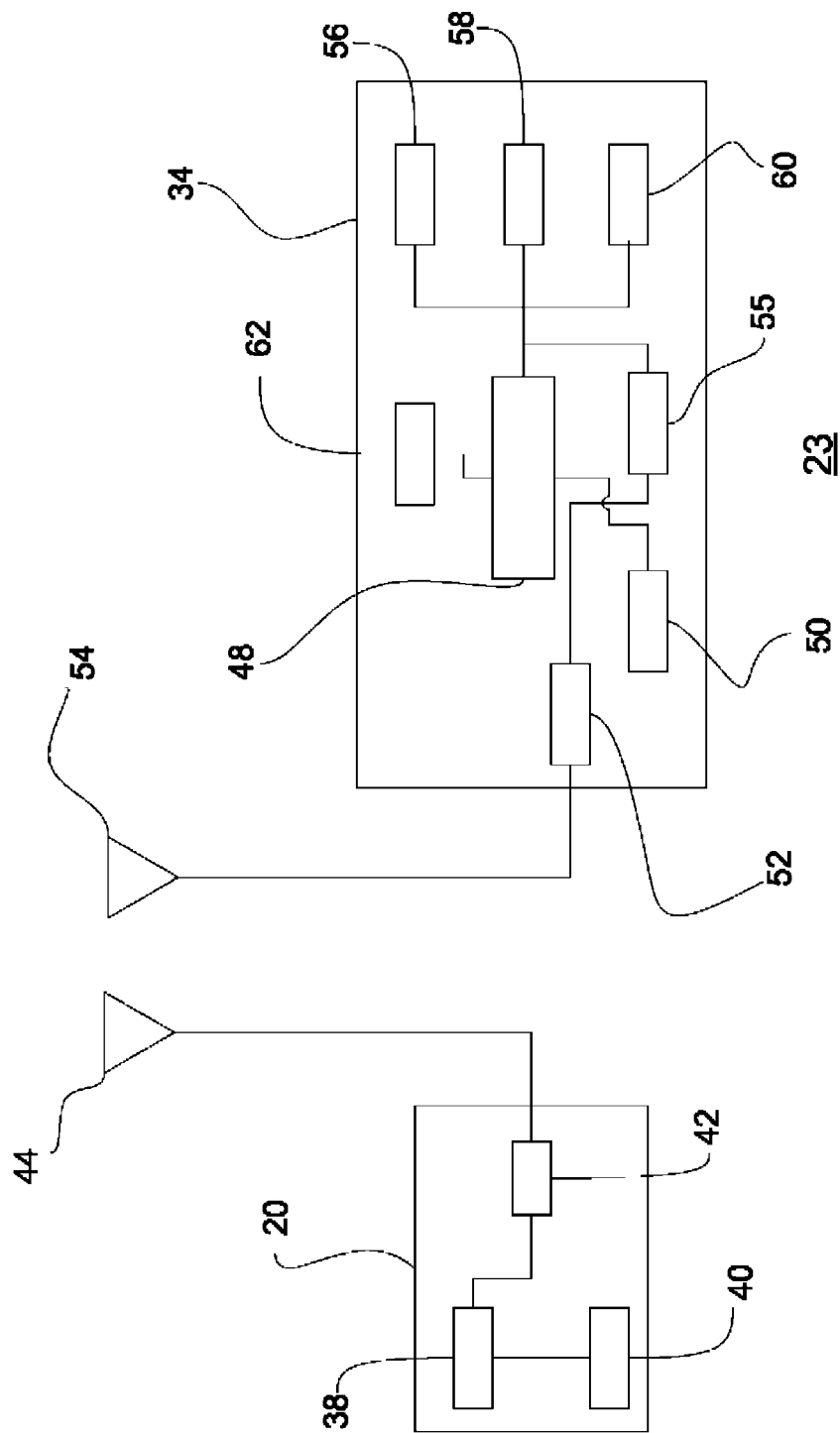
FIG. 4 depicts a schematic block diagram of an exemplary tag and an exemplary reader.

FIG. 4 shows an exemplary passive tag 20 in a block diagram form, and includes a processor module 38, a computer readable medium 40 or memory module, a transmitter/receiver module 42, and an antenna module 44. The transmitter/receiver module 42 controls the communication of data to and from the external reader 34 via the antenna module 44 comprising an antenna and any associated electronic circuitry. The computer readable medium 40 serves many functions including accommodating security data and operating system instructions for the tag 20 which, in conjunction with the processor 38 or processing logic, performs the internal "house-keeping" functions such as response delay timing, data flow control and power supply switching. The computer readable medium 40 may include non-volatile programmable memory and/or volatile memory for data storage. The computer readable medium 40 also facilitates temporary data storage during tag 20 interrogations and response, and store the tag 20 data and retains data when the tag 20 is in a quiescent or power-saving "sleep" state. The computer readable medium 40 may further include data buffers to temporarily hold incoming data following demodulation, and outgoing data for modulation.

The tag 20 data may include, and is not limited to, an identification number or a unique ID used to identify the tag 20 associated with a particular contact lens 10 or 11, SKU, manufacturer, logo, material of manufacture, composition, date of manufacture, lot. no., batch no., warehouse related data; promotional material (rebate for next pair purchase or free trials), lens features and description, lens benefits data, health warnings, data on potential risk or complications, insurance coverage data, regulatory data, authenticity data, encryption data, fitting details, lens type data, lens care or handling information, recommended usage information such as wear schedule, expiration data, URI., lot number, storing liquid medium, UV cut-off, optical refractive index, Abbe value, transmittance % or haze (%) for a particular thickness, and so forth.

As further shown in FIG. 4, an exemplary reader 34 includes a processor module 48, a computer readable medium 50, a transmitter/receiver module 52, an antenna module 54 and a power supply unit 55. The antenna module 54, which may include an antenna array, is coupled to the transmitter/receiver module 52, which includes a transmitter/receiver or multiple transmitters/receivers to emit electromagnetic waves that are used to provide an interrogating field to the tag 20, and receive response signals from the tag 20 via a receiver or multiple receivers. The reader 34 also includes an actuation means for powering on same, the actuation means may be require user intervention, or may be automatic. As such, the actuation means may include any of the following: switch, sensor, proximity switch means (AC or DC inductive and capacitive), or reads triggered by a schedule, an external event or command. The memory capacity on the computer readable medium 50 of the reader 34 can be unlimited, and can be coupled to other memory modules on the devices such as volatile and non-volatile memory, including, but not limited to, flash memory, hard disk drive, Floppy, optical disks (DVDs, CDs etc.) The reader 34 may include a database with a computer readable medium which stores records of any of the above-noted data relating to the contact lens 10. The tag 20 may further include interface circuitry to direct and accommodate the interrogation field energy for powering purposes and triggering of the tag 20 responses. For example, the reader 34 may transmit activating signals or interrogation signals to the tag 20 automatically on a periodic basis. The reader 34 may also employ sleep modes to conserve power. The reader 34 includes input/output means for interacting with the system 23 or for outputting advisory signals or warnings. The input/output means may include, but are not limited to, display means 56, such as a touch screen display with a graphical user interface, a microphone, stylus, keypad, keyboard, buttons, and LED(s) 58, a speaker 60.

More specifically, the computer-readable medium containing program instructions stored thereon, when executed by the processor cause the processor to perform operations comprising causing a data carrier 20, 22, 30, or 32 included with a ophthalmic lens 10 or 11 to emit a data signal periodically, automatically, or in response to a external signal from the data carrier 20, 22, 30, or 32, wherein the data carrier 20, 22, 30, or 32, comprises a device operable in a magnetic and/or electrical mode, such as an RFID tag or a chip with suitable antenna means, a communication interface, such as a wireless interface. The executable instructions also cause the processor to display information related to the data signal, and wherein the information comprises at least one of a SKU, unique ID, manufacturer, logo, material of manufacture, composition, lot no., batch no., warehouse related data; promotional material (rebate for next pair purchase or free trials), lens features and benefits data, health warnings, data on potential risk or complications, insurance coverage data, regulatory data, authenticity data, fitting details, orientation of the lens (inside-out/right side-out or convex surface/concave surface), lens type data, lens care or handling information, recommended usage information such as wear schedule, frequency of wear, compliance data, compliance-related statistics, lens ordering data, filling pharmacy, health professional information, time data, an ophthalmic lens user's personal details, prescription information, right eye/left eye identification data, expiration data, a URI, spectral passing band (nm), UV cut-off, optical refractive index, Abbe value, transmittance % or haze (%) for a particular thickness, lens case replacement schedule, and eye examination schedule. Alternatively, the sensors 66a-d included with the contact lens container 24.

A computer-readable medium containing program instructions stored thereon, when executed by the processor cause the processor to perform operations comprising: causing at least one sensor 66a, b, c, or d included with a ophthalmic lens 10 or 11 to emit a data signal periodically, automatically, or in response to a external signal from the sensor 66a, b, c, or d, via a communication interface; said sensor 66a, b, c, or d for monitoring at least one ambient condition and for logging and recording at least one reading associated said at least one ambient condition, following a predetermined event; comparing said at least one reading to a predetermined threshold and providing an outcome, said predetermined threshold corresponding to said at least one ambient condition, issuing an alert based on said outcome; and wherein said at least one of a said at least one ambient condition provides sensed data related to at least one of protein concentration, composition of the lacrimal fluid, fungus, pathogens, virus, bacteria, concentrations of compounds in a lens care product, pH level, eye temperature, eye pressure, eye moisture, oxygen reaching the eye, blink rate, pressure from rubbing, frequency of wear, exposure to a lens care product, usage habits, vital signs, pulse rate, oxygen, lacrimal fluid content, protein content, temperature, geolocation coordinates, chemicals, chemical compounds, acoustic energy, moisture content, humidity, smoke, vibration, light, radiation, magnetic fields, air quality, power, motion, global positioning, geo-location, orientation, acceleration, or changes thereof.

In the instance of output signals being in the form of audible signals, a speaker 60 outputs a particular audible signal depending on the outcome of the match/non-match determination. Also, the speaker 60 may emit an audible signal with a particular duty cycle of indicative of a positive state or a negative state, such as a fast beeping sound for a non-match and a slow beeping sound for a match. However, these messages may include both visual signals and audible signals. Advantageously, audible signals are beneficial where ambient light conditions are poor, or when vision is impaired temporarily, or when a visual aid is required to decipher the information presented via the output means 56. Alternatively, the system 23 may include only one reader 34 or 36 to determine the identity of the lenses 10, 11, such that a user can determine the identity of the lens 10 or 11 before storage, in order to place the lens 10 or 11 in the correct receptacle 26 or 28, or before insertion of the lens 10 or 11 into the eye.

In one exemplary embodiment, the contact lens 10 is included with data at manufacture or post manufacture, such data includes, but is not limited to: expiration data, SKU, manufacturer, authentication data, date of manufacture, is written onto the memory 40 of the tag 20. In another exemplary embodiment, the contact lens 10 is associated with a tag 20 post-manufacture, such as, at the dispensing point or point-of-sale (POS) by an eyecare practitioner, such as, optometrists, ophthalmologists and opticians, or at the operating point by the user. Therefore, the eyecare practitioner can write data onto the tag 20, as stated above.

Figure 5:
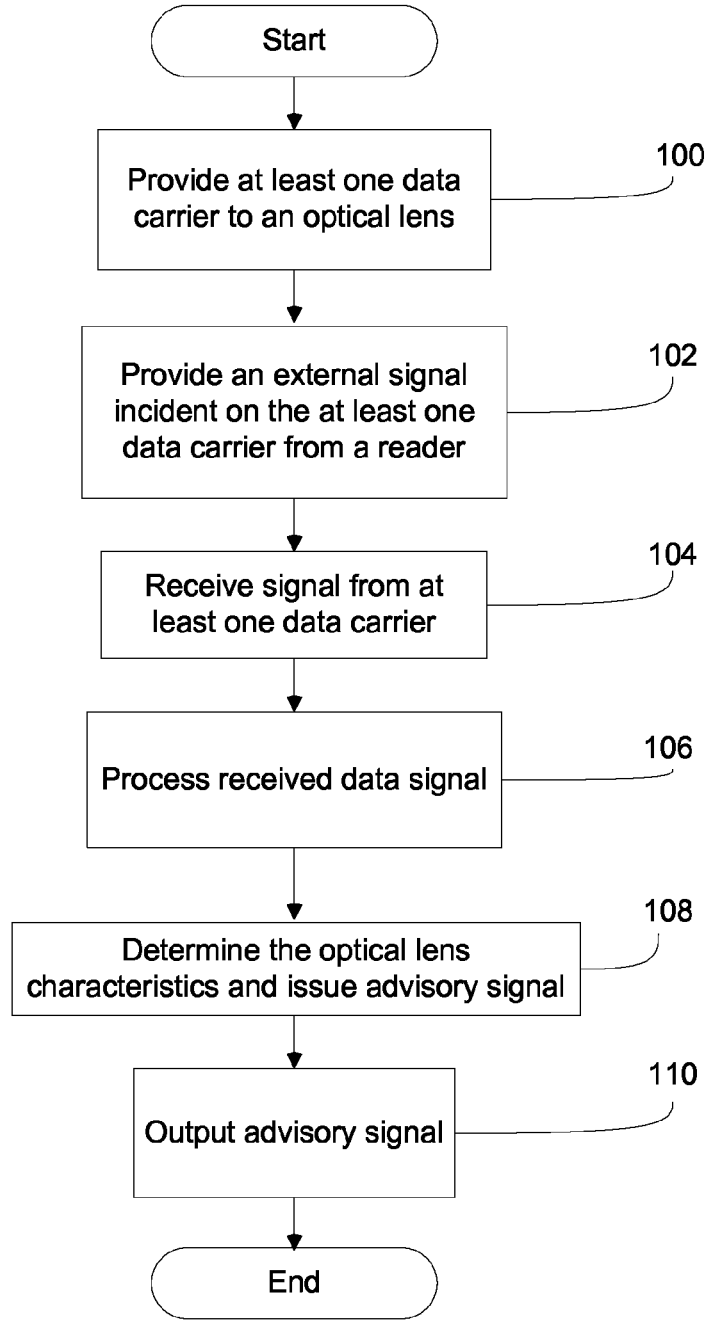
FIG. 5 is flowchart outlining the exemplary steps for determining contact lens compliance.

In another exemplary embodiment, the system 23 or reader 34 tracks the age or the time the optical device 10 has been in use, or the wearable life or useful life of an optical device 10. For example, the system 23 or reader 34 may determine the impending expiry of the lens 10, or detect non-compliance and notify the user accordingly. As stated above, non-adherence to the recommended wear or replacement schedule, or prolonged use of the expired lenses 10, 11 may cause discomfort, inflammation, swelling, abrasion, or another problem that could result in permanent eye tissue damage. Additionally, for toric lenses 10, 11, which unlike sphericals do not rotate in the eye, certain areas of the lens 10 or 11 build up deposits more quickly than others. An uneven build up of deposits may impact on the rotational stability of the lens 10 or 11. The method for determining the tracks the age, wearable life or useful life of an optical device 10, such as a contact lens 10, will now be described, with reference to the flowchart of FIG. 5. The method includes the step of providing an identifying means comprising a data carrier with the contact lens 10, in step 100. The data carrier includes a device 20 operable in at least one of an electrical mode and a magnetic mode, such as a tag 20, as described above. The contact lens 10 is included with a tag 20 at manufacture, or included with the lens 10 post manufacture by any suitable means, and data, such as: expiration data, SKU, manufacturer, authentication data, date of manufacture, is written onto the memory 40 of the tag 20, in step 102.

Also, additional data may be included with the tag 20 post-manufacture of the lens 10. Data may be written at the dispensing point or point-of-sale (POS) by an eyecare practitioner, such as, optometrists, ophthalmologists and opticians, or at the operating point by the user. The post-manufacture data in addition to contact lens manufacture data, as stated above, may include prescribing eyecare practitioner, filling pharmacy, health professional information, date & time the prescription was filled, lens user's personal details, prescription information, right eye/left eye identification data, fitting details, and so forth. As stated above, the contact lens 10 may be associated with an tag 20 post-manufacture of the lens 10, such as, at the dispensing point or point-of-sale (POS) by an eyecare practitioner, such as, optometrists, ophthalmologists and opticians, or at the operating point by the user. Therefore, the eyecare practitioner can write data onto the tag 20, as stated above.

Next, an activation signal is provided from an external means, such as a reader 34, in step 104. The tag 20 is thus energized by the activation signal to cause the tag 20 to emit data in response to the activating signal. The time when the contact lens 10 is first interrogated by the reader 34 is recorded, this time may correspond to the time the contact lens 10 is first introduced into the container 24. The transceiver 52 receives the data and the processor module 48 processes the received data, in step 106.

A counter 62 coupled to the processor 48 and tracks the elapsed time from, or to, a time reference, such as the first instance of interrogation of the lens 10 by the reader 34 marking first time use, and notifies the logic means 48 when a particular time threshold has been reached, close to be reached or surpassed. The time reference or time threshold may be user defined, or third-party defined, or the date of manufacture, or the expiration date. The counter 62 may be a real time clock, for example, the recommended period of wear may be expressed in hours or days. The counter 62 may count up or count down from one particular time reference to another particular time reference, and these particular time references may be associated with a request for action from the user, or may be an advisory signal. For example, the counter 62 may count up from the date of manufacture to the expiration date, and outputs the wearable time remaining. The processor module 48 then issues an advisory signal associated with the contact lens 10, in step 108. The user can be notified of impending expiry, and actual expiry, of the lens 10 via an advisory signal means, either visually or auditorily or some other a stimulus to a human body, step 110. At this time, the user may be prompted to seek a new prescription or obtain a new lens 10 or 11 or a lens pair 10, 11. The system 23 may also inform the user the minimum period the contact lens 10 or 11 should be left out of the eye before re-insertion, or the recommended number of times, if any, that the contact lens 10 or 11 should be cleaned. Should the right lens 10 and the left lens 11 have different expiration dates, as in the case when one lens 10 or 11 is damaged or lost and has to be replaced singly, then each lens 10, 11 may have its own counter 62.

The counter 62 may determine the age or wearable life of the lens 10 or 11 by comparing the expiration date or the manufacturing date to contemporaneous time data related to the interrogation by the reader 34. The system 23 may issue advisory signals visually, such as "Lens Expired", "Change Lens", "Remove Lens Daily", Store Lens for 5 hrs each day", "Clean Lens", "45 Days left", "New Rx required", "Call EyeDoc for Checkup", "Check-up in 2 weeks" messages or a plethora of symbolic messages, as depicted in FIG. 1. The advisory signal may also be audible. The system 23 can output the advisory signals automatically or the user can query the system 23, using an interactive display or keypad or buttons coupled to the reader 34. The system 23 may also analyze the received data and track the amount of time the lenses 10, 11 are actually worn by the user, and compile reports relating the user data, such as statistical data. Therefore, the system 23 may thus determine whether the user is in compliance with the prescription, with respect wear schedule, replacement schedule, or lens care. For example, using the statistical data the system 23, or third parties, may determine whether dailies are worn for more than 24 hrs, or whether overnights are being worn beyond the prescribed maximum time period, such as 30 days. Using the historical data, the system 23, or third parties, may recommend a wearing time dependent on the user's individual needs, or recommend another prescription with a different wearing schedule. The reports may also be issued to other interested parties, such as, eye practitioners and insurance companies.

In another exemplary embodiment, the lens 10, 11 include at least one sensor 66*a*, *b*, *c* or *d*, for producing a measurable response to a change in a physical condition, which is logged in conjunction with an in-built timer or clock 62. A continual analog signal sensed by the devices 66*a-d* is digitized by an analog-to-digital converter and sent to controllers for further processing. Typical characteristics and requirements of a sensor node 66*a-d* call for a relatively small size, and consume extremely low energy, being autonomous and able to operate unattended, and being adaptive to the environment. The devices 66*a-d* may be passive, semi-active or active. An exemplary sensing device 66 is a self-contained unit having sensing elements, data loggers with a computer-readable medium, such as a non-volatile memory, for data storage and program instructions. The internal software runs multi-phased, variable-interval test sequences that collect data. The controller logic unit performs important functions, such as providing information such as the sensor type and location, as well as calibration factors. It also provides dynamic information such as recording status, memory capacity, and battery level. The controller logic unit may also execute specific application algorithms to process the raw data to produces a digital data output. Also, feeding into the controller logic unit is a real-time clock, enabling all readings to be date and time stamped. The sensor 66*a* also includes a communications interface, such as an RF, wireless, or optical interface, for communicating with the reader 34; or other sensors 66*b-d*. The wireless sensor 66*a*, *b*, *c* or *d* gathers information from the environment through measuring various phenomena, as stated above. The sensor 66*a*, *b*, *c* or *d* may transmit the acquired data via an RFID interface, and may be active, semi-active or passive. The device 66*a*, *b*, *c* or *d* may be self powered or powered from external sources, as such, exemplary power sources include energy storage devices and/or energy scavenging devices. An energy storage device may be a battery, a Zn-air cell, or a capacitor. An energy scavenging device may include energy from the environment, such as radiation (solar, RF, and so forth), or photovoltaic energy. Other sources include vibration spectra of office windows, copy machines, microwave ovens, industrial motors, freeway traffic, RF power, or human gait.

The devices 66*a-d* are so positioned and programmed to monitor predefined conditions and acquire specific measurements, for example device 66*a* may be programmed to measure and record vital signs, pulse rate, oxygen, lacrimal fluid content, protein content, temperature, pH level, geolocation coordinates, chemicals, chemical compounds, acoustic energy, moisture content, humidity, smoke, vibration, light, radiation, magnetic fields, air quality, power, motion, global positioning, geo-location, orientation, acceleration, or changes thereof, among others. Any of these recorded measurements may be analyzed in real-time or later, and should such measurements exceed the predetermined thresholds then corresponding advisory signals or alerts are issued.

In another exemplary embodiment, all or some of the processing and analysis of the acquired data is performed by the sensor means 66a, b, c or d, to issue a warning or an alerts as necessary when predetermined thresholds for any of the measured parameters are exceeded. Alternatively, the sensor 66a, b, c or d may record the data and transmit the data to another computing device for processing, the transmission may occur automatically or when the sensor coupled to a computing device, via a wired or wireless connection.

Preferably, the wireless sensor 66a, b, c or d is located on the lens 10 in a predetermined location, and dimensional so that it does not interfere substantially with the lens 10 configuration, alter the prescription, or cause the lens 10 to deteriorate, or does not irritate the eye of the lens wearer or give any discomfort to the lens wearer. The wireless sensor 66a, b, c or d may include data comprising, but not limited to, an identification number or a unique ID used to identify the sensor 66a, b, c or d associated with a particular contact lens, SKU, manufacturer, logo, material of manufacture, composition, date of manufacture, lot. no., batch no., warehouse related data, promotional material (rebate for next pair purchase or free trials), lens features and description, lens benefits data, health warnings, data on potential risk or complications, insurance coverage data, regulatory data, authenticity data, encryption data, fitting details, lens type data, lens care or handling information, recommended usage information such as wear schedule, expiration data, URI., lot number, storing liquid medium, UV cut-off, optical refractive index, Abbe value, transmittance % or haze (%) for a particular thickness, and so forth.

As an example, oxygen measurements allow the system 23 to determine the mount of oxygen reaching the cornea, and mitigate against ocular problems, such as, eye dryness or irritation. Such data collected may be used to create a suitable prescription, including recommendations regarding the ideal contact lens type for the user, or provide warnings or alerts if the recommended amount of oxygen is not reaching the cornea. Eye temperature, and or pulse rate measurements may recorded and analyzed to determine the wear schedule of the lenses 10, 11 or frequency of wear of the lens 10 or 11, and correspondingly the lens care habits of the user, and trigger the issuance of advisory signals.

Meanwhile, data related lacrimal fluid content and protein content build up on the lenses 10, 11 may also be used to determine the wear schedule of the lenses 10, 11 or frequency of wear, and correspondingly the lens care habits of the user, and also trigger the issuance of advisory signals, or cause the user to initiate, an order of replacement lenses 10, 11, on a valid prescription, or lens solution or lens accessories. Alternatively, the system 23 automatically initiates and completes the order. For example, the sensor 66a, b, c, or d, may be configured to detect proteins such as, lysozyme, IgA, lactoferrin, and IgG, or any other proteins that might contribute to surface deposits on contact lenses 10, 11, and advisory signals or warnings are issued in the event that a predetermined threshold for at least one of the proteins is exceeded.

Based on the characteristic composition of the lacrimal fluid, an eyecare professional may use this data to select from among the various types of contact lenses 10, 11 the one that the wearer can be expected to tolerate, thus aiding in proper lens fitting. Chemical compound measurements and or moisture content levels may also be used to determine the lens care habits of the user, such as, proper use of cleaning solutions, rinsing solutions, disinfecting solutions, multipurpose solutions rewetting solutions or artificial tear products. For example, sensor 66a, b, c or d is able to determine the length of time the lens 10 or 11 is exposed to a certain lens care product. Alternatively, the sensor 46a, b, c or d may detect concentrations of compounds found in such lens care products, such as, dymed (polyaminopropyl biguanide), hydranate (hydroxyakylphosphonate), boric acid, ethylenediamine tetmacetate, poloxamine, sodium borate, sodium chloride. This data may also be used to advise the user to rinse and change the solution in the contact lens case 24. Also, some users suffer from contact lens solution toxicity where the user experiences an unwanted reaction to certain solutions, such as noninfectious (inflammatory), allergic, or both. Typical symptoms of toxicity include redness of the eye, pain, itching, tearing, sensitivity to light, decreased or blurred vision, discharge from the eyes, and inability to wear the contact lenses 10, 11. In such as scenario, should the sensor 66a, b, c or d detect any active ingredients or preservatives above predetermined thresholds, advisory signals or warnings are issued, and recommendations for a suitable solution may also be issued.

In another exemplary embodiment, based on the detected compounds, the system 23 is able to determine the product SKU of the solution and issue appropriate advisory signals, such as, recall notices, advertisements, rebates, or new product information. Correspondingly, the system 23 provides the user to select the solution in use with the contact lens 10, 11, associates the solution with contact lens 10, 11, such that appropriate advisory signals may be issued upon periodic cross-reference with third parties, contact solution manufactures, database, and so forth. Alternatively, the third parties, contact solution manufactures or database may push such advisory signals as appropriate.

In another exemplary embodiment, the sensor 66a, b, c or d is included with the contact lens container 24 to detect proteins, composition of the lacrimal fluid, fungus, pathogens, viri, bacteria, such as Gram-negative, *Pseudmonas aeruginosa*, Gram positive, *Staphylococcus aureus* and *Staphylococcus Epidermidis*, among others, which lead to microbial keratitis, or fungal, herpetic, mycobacterial microbial keratitis. The sensors 66a-d may also detect concentrations of compounds found in such lens care products, such as, dymed (polyaminopropyl biguanide), hydranate (hydroxyalkylphosphonate), boric acid, ethylenediamine tetraacetate, poloxamine, sodium borate, sodium chloride. The sensed data may also comprise data related to eye temperature, eye pressure, eye moisture oxygen reaching the eye, blink rate, pressure from rubbing, and light. This data may also be used determine usage habits or compliance to proper lens care, and thus the data may be used to advise the user to clean, rinse and dry the contact lens container 24, change the solution in the container 24, replace the contact lens 10, or the contact lens container 24, in order to avoid complications due to non-compliance, as depicted in FIG. 1.

Alternatively, the system 23 issues advisory signals, such as reminders, alerts & warnings, to the user and third parties, such as, eye-care practitioners, pharmacy or central server/database via the wired or wireless network. The alerts may be provided via telephone, voice-mail, fax, email, SMS, IM, MMS, website, social networking site, 'snail' mail, courier, and so forth. Alternatively, third parties receive the advisory signals for analysis and may take certain actions based the nature of the advisory signals. For example, upon receipt of an advisory signal pertaining to creased, ripped or damaged contact lens 10, the third party may automatically fill a new prescription for replacement lenses 10, 11 and send them to the user, or may seek user intervention before filling the new prescription, in accordance with user-determined lens replacement rules. Alternatively, a third party may issue recall notices directly to affected users based on the device 10 characteristics, such as batch no., SKU, manufacturer, date of manufacture, material, and so forth. Affected users may be automatically provided with new lenses 10, 11, without any user intervention in a dess process. Such advisory signals may also be used for a container 24 with limited display capabilities or a reader 34, with limited computing resources, coupled to a digital data processing device 64 or the network. Other advisory signals may comprise recall notices, advertisements, rebates, or new product information, URIs, URIs to product information.

The third party may also analyze the received data and track the amount of time the lenses 10, 11 are actually worn by the user, and compile reports relating the user data. The third party may thus determine whether the prescription is being followed, for example if dailies are worn for more than 24 hours, or whether overnights are being worn beyond the prescribed maximum time period, such as 30 days. Using the received data, the third party may recommend a wearing time dependent on the user's individual needs, or recommend another prescription with a different wearing schedule. The reports may also be issued to the user and any other interested parties, such as, insurance companies, parents or guardians.

In another exemplary embodiment, the sensor devices 66a-d include at least one sensor 66a is assigned to measure one or more environmental variables, and may communicate with the other sensor devices 66b-d, and transmit their acquired data, such that each of the sensor devices 66a-d includes the acquired data of all other sensor devices 66a-d. As such, the spatially distributed autonomous devices 66a-d may form a wireless sensor network using sensors 66a-d to cooperatively monitor physical or environmental conditions, such as temperature, sound, vibration, pressure, motion or chemical or biological agents, at different locations. Alternatively, certain devices 66a-d are designated to receive acquired data from other devices 66a-d. A sensor node 66a, b, c, or d, or mote, within the wireless sensor network, is capable of performing processing, gathering sensory information and communicating with other connected nodes 66a, b, c, or d in the network. Typically, the mote 66a, b, c, or d is a computing entity having a programmable microprocessor, a transceiver (circuitry for transmitting and receiving data) a power source, antenna, and a computer readable medium for instructions and data storage. The microprocessor integrated circuit provides sensor signal processing, communication, control, monitoring other motes 66a-d, data storage and energy management. As an example, acquired environmental data may be passed on to the radio link for transmission from mote 66a to mote 66b until data reaches a transmission node 66c coupled to the network 18. These radio links between motes 66a-d may have a transmission distance in the range of 10-200 feet, or greater. Alternatively, data transmitted from at least one of the motes 66c is provided to the database 16, or other network entities for analysis. If the analysed data indicates non-compliance, the contact lens is immediately flagged and a warning or alert is issued to the user or a third party, such as, an eye care professional, pharmacist, insurance provider, or parent or guardian.

In one exemplary embodiment, the reader 34 is integrated with a portable computing device 64, or communications device, such as a smartphone. In one example, a communications device with an integrated reader 34 interrogates the data carrier of lenses 10, 11 at predetermined intervals when adjacent to the lenses 10, 11, for example, when placed to the car while in conversation. The device 64 can thus issue advisory signals to the user, and the advisory signals may be displayed on the display screen or announced to the user at predetermined moments, such as, on powering on the device, or before performing other actions on the device, such as making a call, selecting a playlist or sending a text message, or pop-up reminders during any of said user actions on the device. Alternatively, the advisory signals or alerts may be automatically included with the device's 64 scheduling software or calendar application, or the advisory signals may be sent to any user-defined recipient.

As an example, the tag 20 may include the contactless IC chip, which is manufactured by Hitachi, Japan, measuring 0.15×0.15 millimeter (mm), 7.5 micrometer (μm) thick or the μ-chip™ which features an internal antenna. These chips can thus operate entirely on their own, making it possible to use μ-Chip as RFID IC tags without the need to attach external devices, such as antennae, making these tags, or similar tags, ideal for application in the present invention. Similar to the 0.15 mm square chip, the μ-chip is manufactured by Hitachi, Japan, using silicon-on-insulator (SOI) fabrication process technology. The μ-chip operates at a frequency of 2.45 GHz, and includes a 128-bit ROM for storing a unique ID and may include a non-volatile memory. Typically, this type of tag 20, or similar, is dimensioned to be attached to, imprinted on, or embedded in a contact lens 10 or 11 without detriment to the user's vision or comfort. Other suitable next-generation multi-band UHF-RFID tags with built-in antenna, such as UHF-RFID chips in 800 MHz-2.45 GHz frequency-range may be used, or any tags based on the EPCglobal standard, such as the EPCglobal UHF Generation 2 standard. Another suitable tags include an 'internal' coil antenna is formed directly on the surface of the chip, such as Coil-On-Chip™ technology from Maxell, Japan.

In another exemplary embodiment, the data carrier 20 and the sensors 66a-d comprise devices manufactured using printable electronics technology, such as printed RFID ICs, or organic, chipless, polymer-based tags, or made with conductive inks that can store and transmit data. For example, tags 20 may be produced with common commercial printing processes such as flexographic, rotogravure, offset or rotary screen using special inks and materials. A variety of electronic inks with conductive, insulating, or semiconductor qualities, are printed in successive layers on plastic substrates to form electronic circuits including organic field effect transistors (OFETs). The electronic inks may be opaque, or transparent and thus undetectable to the human eye, and are compatible with the particular contact lens material. In an exemplary method of developing and manufacturing complete RFID tags uses ink jet technology used to print silver fluid, or inks containing silver dispersions, with features of less than 20 microns. The printable antenna and the circuit chip may be printed directly onto the suitable contact lens material, such that, at least one antenna and at least one circuit chip is electrically connected to the anterior surface, and/or the opposing posterior surface of the contact lens material. Alternatively, the antenna and the circuit chip may be printed onto a polymer film material, or other suitable carrier material, which is attached to the contact lens. Alternatively, active tags may include printable photovoltaics, or printable batteries. In yet another exemplary embodiment, the tag 20 is a magnetic tag, based on nanotechnology and microtechnology. The magnetic tag 20 includes certain materials which possess unique magnetic properties that permit individual items to be precisely identified.

In another exemplary embodiment, a reader 34 resident on the container 24 includes a network interface for coupling to a digital data processing device 64 or network. The network can include a series of network nodes (e.g., the clients and servers) that can be interconnected by network devices and wired and/or wireless communication lines (e.g., public carrier lines, private lines, satellite lines, etc.) that enable the network nodes to communicate. The transfer of data (e.g., messages) between network nodes can be facilitated by network devices, such as routers, switches, multiplexers, bridges, gateways, etc., that can manipulate and/or route data from an originating node to a server node regardless of dissimilarities in the network topology (e.g., bus, star, token ring), spatial distance (e.g., local, metropolitan, wide area network, internet), transmission technology (e.g., TCP/IP, Systems Network Architecture), data type (e.g., data, voice, video, multimedia), nature of connection (e.g., switched, non-switched, dial-up, dedicated, or virtual), and/or physical link (e.g., optical fiber, coaxial cable, twisted pair, wireless, etc.) between the originating and server network nodes. As an example, the reader 34 may be coupled via a wired or wireless connection, such as Ethernet, IEEE 1394, TDMA, COMA, GSM, EDGE, PSTN, ATM, ISDN, 802.1X, USB, Parallel, Serial, DART (RS-266c), among others. In this case, the input/output means for interacting with the system 23 are embodied within the digital data processing device, such as the graphical user interface, display means, stylus, keypad, keyboard, buttons, touch screen display, microphone, and speaker.

In another exemplary embodiment, as shown in FIG. 1, the reader 34 is integrated in a digital data processing device 64, which can include a personal computer (PC), a computer workstation, a laptop computer, a server computer, a mainframe computer, a wearable computing device, a tablet computing device, a handheld device (e.g., a personal digital assistant (FDA), a Pocket PC™, a cellular telephone, an e-mail device, a smart phone, a wrist watch, an information appliance, and/or another type of generic or special-purpose, processor-controlled device capable of receiving, processing, and/or transmitting digital data. Typically, a digital data processing device 64 includes a processor, a computer readable medium and input/output means. Processor refers to the logic circuitry that responds to and processes instructions that drive digital data processing devices such as, without limitation, a central processing unit, an arithmetic logic unit, an application specific integrated circuit, a task engine, and/or combinations, arrangements, or multiples thereof. Instructions for programs or other executables can be pre-loaded into a programmable memory that is accessible to the processor and/or can be dynamically loaded into/from one or more volatile (e.g., RAM, cache, etc.) and/or non-volatile (e.g., a hard drive, optical disk, compact disk (CD), digital video disk (DVD), magnetic disk, magnetic tape, internal hard drive, external hard drive, random access memory (RAM), redundant array of independent disks (RAID), IC memory card, flash memory, or removable memory device) memory elements communicatively coupled to the processor. The instructions can, for example, correspond to the initialization of hardware within the digital data processing devices, an operating system that enables the hardware elements to communicate under software control and enables other computer programs to communicate, and/or software application programs that are designed to perform operations for other computer programs. Thus, a set of instructions is included in the computer-readable medium is for performing operations or functions related to the system 23 or the operation of the digital data processing device 64. For example, the system 23 may provide a computer program product encoded in a computer-readable medium including a plurality of computer executable steps for a digital data processing device 64 to determine the identity of a lens 10 or 11, or determine whether the lens 10 or 11 is inside-out, or whether the lenses 10, 11 need to be replaced based on the expiration data. A user can interact with the system 23, for example, viewing a command line, using a graphical and/or other user interface, and entering commands via an input device, such as a mouse, microphone, a keyboard, a touch sensitive screen, a stylus, a track ball, a keypad, etc., and receiving advisory signals via output means such as display means, speaker, LEDs, and so forth, as shown in FIG. 1. Inputs from the user can be received via an input/output (I/O) subsystem and routed to processor via an internal bus (e.g., system bus) for execution under the control of the operating system. The input/output means for interacting with the system 23 may be embodied within the digital data processing device 64, such as the graphical user interface, display means, a touch screen display, stylus, keypad, keyboard, buttons, a microphone, and a speaker. Alternatively, the reader 34 can be added onto any of the aforementioned devices 64 as a peripheral, such as an SD/SDIO card reader inserted in an SD/SDIO card slot of the device 64, or a USB reader, or a serial reader, or a reader coupled to a dock connector.

More specifically, the computer-readable medium 60 comprises program instructions stored thereon, when executed by the processor cause the processor to perform operations comprising: causing at least one sensor 66a, b, c, or d, included with a ophthalmic lens 10, 11 to emit a data signal periodically, automatically, or in response to a external signal from the at least one sensor via a communication interface; the at least one sensor 66a, b, c, or d, for monitoring at least one ambient condition and for logging and recording at least one reading associated the at least one ambient condition, following a predetermined event; comparing the at least one reading to a predetermined threshold and providing an outcome, the predetermined threshold corresponding to the at least one ambient condition, issuing an alert based on the outcome; and wherein the at least one of a the at least one ambient condition provides sensed data related to at least one of protein concentration, composition of the lacrimal fluid, fungus, pathogens, virus, bacteria, concentrations of compounds in a lens care product, pH level, eye temperature, eye pressure, eye moisture, oxygen reaching the eye, blink rate, pressure from rubbing, frequency of wear, exposure to a lens care product, usage habits, vital signs, pulse rate, oxygen, lacrimal fluid content, protein content, temperature, geolocation coordinates, chemicals, chemical compounds, acoustic energy, moisture content, humidity, smoke, vibration, light, radiation, magnetic fields, air quality, power, motion, global positioning, geo-location, orientation, acceleration, or changes thereof.

Alternatively, the reader 34 is a standalone handheld device, or is coupled to a digital data processing device 64 or network. A non-integrated reader 34 may be used with multiple containers 24, so that contact lens case 24 may be disposed of periodically to reduce your risk of infection. Therefore, a non-integrated reader 34 may be more economical than an integrated reader 34, as the non-integrated reader 34 can be easily associated or dc-associated with a contact lens container 24 to permit re-use with another container 24, while also maintaining historical data pertaining to the user, contact lens 10 use, and so forth.

The reader 34, either standalone or attached or integrated in the digital data processing device 64, may be coupled to another digital data processing device 64 or network to enable a user to order lenses 10, 11, for example, when the lenses 10, 11 are nearing expiration, have expired, or have been damaged. Through the input/output means for interacting with the system 23, a user may place carry out a transaction for the purpose of ordering or purchasing lenses 10, 11 from a pharmacy, retailer or virtual store for a replacement lens or pair, based on the data stored on the tag 20. The prescription details, user details, shipping address, eyecare practitioner information, and so forth, are sent to the pharmacy, retailer or online store via a wired or wireless connection to carry out a commercial transaction; and any suitable payment means, such as, credit cards, debit cards, cheque, wire transfer, electronic money, C.O.D., and so forth, may be used to complete the transaction. In one example, the system 23 includes an RFID-NFC enabled mobile device 64, capable of ordering a pair of lenses 10, 11. Near Field Communication (NFC) technology, a very short-range radio frequency identification (RFID) protocol that provides secure communications between various devices. By having this relatively short read distance, security is enhanced as this substantially diminishes the possibility of eavesdropping or man-in-the middle attacks. In a NFC-enabled mobile device 64, such as a mobile phone, the reader 34 is powered by the batteries within a mobile phone 56 to allow communication with a NFC tag 20 on a lens 10. Using account information stored in the mobile device 64 the user can automatically place an order to a pharmacy or retailer for a replacement lens 10 or 11 or lens pair 10, 11, based on the data stored on the tag 20, and any other data provided by the user. The reader 34 within the mobile device 64, or wallet phone, automatically connects via the cellular connection or through NFC-enabled Wi-Fi or Bluetooth to the pharmacy, retailer or virtual store to carry out the commercial transaction. Alternatively, the lenses 10, 11 may be ordered automatically by the system 23, or by the pharmacy, retailer or virtual store, upon determination of impending expiry of the lenses 10, 11, or in accordance with predetermined lens replacement rules stored in a computer readable medium 50.

In yet another exemplary embodiment, communication may be accomplished between the reader 34 and a tag 20 via different media or frequencies for different purposes (e.g., infrared light, or acoustics).

In another exemplary embodiment, the tag 20 is configured as a read-only tag, programmable write-once/read-many tag, or re-programmable read-many/write-many tag. In general, read-only tags have permanent unalterable code (e.g., identification and/or other data), which is fixed in embedded memory at the time of manufacture. Programmable write-once/read-many tags include embedded memory that can be written to once in the field with the desired information. Re-programmable read-many/write-many tags include embedded memory that can be written to multiple times with the desired information. Since it is impossible to rewrite the data on a write-once/read-many tag, this provides a high level of security and authenticity. Upon purchase of the lens with the passive tag 20, the data, such as, the unique ID, is associated with the prescription details, and other data as described above. Therefore, the unique ID used to perform a lookup in a secure system, and no unique personal information about the user is present within that unique ID. As described above, a reader 34 with a network interface is coupled to a digital data processing device 64 or network to access the data record with the unique ID. Therefore, as an example, the unique ID may be associated with a right lens 10 or a left lens 11, such that the invention can be practiced as described above.

In another exemplary embodiment, the container 24 include a releasable lock operable in accordance with the identity of the lenses 10, 11, the age or wearable life of the lenses 10, 11 and/or the identity of the user, or compliance data. In one example, following a predetermined number of advisory signals imploring the user to replace the lenses 10, 11, or container 24 due to expiry or possible contamination, or seek a new prescription, the container 24 is locked, and can only be opened after resetting the lock, or overriding the system 10.

In yet another exemplary embodiment, the tag 20 includes a photovoltaic array that acts as both a light signal receiver (extracting data and clock information from the reader) and a means to convert light into electrical power to operate the RFID digital IC chip. The tag 20 responds to a unique signal from the tag reader and when activated, would send information back to the reader 34, via electromagnetic means.

In yet another exemplary embodiment, the system 23 supports various security features that ensure the integrity, confidentiality and privacy of information stored or transmitted, such as: (a) mutual authentication—where the tag 20 can verify that the reader 34 is authentic and can prove its own authenticity to the reader 34 before starting a secure communication session or a secure transaction; (b) strong information security for complete data protection, information stored on tag 20 can be encrypted and communication between the tag 20 and the reader 34 can be encrypted to prevent eavesdropping. The authentication data of the contact lens 18 is verified with the logic means 48 or external means to help combat counterfeiting. Additional security technologies may also be used to ensure information integrity. Additionally, the tag 20 may include built-in tamper-resistance by employing a variety of hardware and software capabilities that detect and react to tampering attempts and help counter possible attacks. The system 23 may also include the ability to process information and uniquely provide authenticated information access and protect the privacy of personal information. The tag 20 can verify the authority of the information requester 34 and then allow access only to the information required. Access to stored information can also be further protected by a challenge-response scheme, such as a personal identification number (PIN) or biometrics to protect privacy and counter unauthorized access. Other security options include providing only non-confidential information on the tag 20, and using information pointers, rather than actual information, using 'kill commands' to permanently render the tag 20 inoperable by at any point in the life of the lens 20 while protecting against inadvertent or malicious disablement of the tag 20, or using a disguised EPC number, or unique identifier, during transaction to helping protect tag identity and tag data.

In yet another exemplary embodiment, the above methods and systems are applicable to the optical devices which are used for a component, or the like, of an optical instrument or information equipment, where identification and/or orientation (installing direction of an optical device, such, back surface or front surface, or side) of the optical device may need to be readily determined prior to installation or use within certain equipment. For some optical applications, the individual optical components must be mounted in a system structure, and the components have certain characteristics, such as, spectral passing band (nm), UV cut-off, optical refractive index, Abbe value, transmittance % or haze (%) for a particular thickness, thermal coefficient of expansion, density, UV cut-off, MILcode. Such devices may include, but are not limited to, pickup lens of an optical communication disk, an optical communication module, a pickup lens of a laser printer, an optical disk device, camera lens, and a telescope lens, lens for a monocular, binoculars, telescope, spotting scope, magnifier, telescopic gun sight, theodolite, microscope, and camera (photographic lens), among others. The optical devices may be fabricated using a variety of materials including optical glasses, engineered plastics and crystalline materials. Glass material is the most common type because of its excellent optical properties such as high light transmission and environmental stability. Other materials include quartz, sapphire, fused silica, and a wide range of plastics, such as, acrylic (PMMA), polystyrene polycarbonate (optical grade), NAS, polyolefin (Zeonex), Arton F, Optores (OZ1000-1100), Optores (OZ1310-1330), among others, and glass-ceramic materials. Plastic optics can also be combined with glass optics to form hybrid optical systems. Therefore, providing the optical lens with at least one data carrier for carrying data related to the optical lens facilitates acquiring the relevant data. This method and apparatus is particularly beneficial where the devices are relatively small, thus making it difficult to employ prior art methods, such as, engraving, for visual inspection by a user to determine the installation surface. As a further example, the age of the optical devices, such as, resistive touchscreens can be tracked or determined, such that usage in field can be studied, or compared to MTBF ratings, or the age may be used to determine a replacement schedule.

Although a plurality of data carrier means activatable by suitable fields have been specifically disclosed herein, it is to be understood that the present invention is not restricted to these. Any electrically and/or magnetically operable device suitable for the indicated purpose may be employed in embodiments of the present invention. In particular, it is to be understood that the operation of the data carrier means need not be wholly electrical and/or magnetic, and thus for example optical and/or acoustic elements may be employed in conjunction with electrical and/or magnetic devices in alternative embodiments.

It is further to be understood that the invention is not restricted to magnetic and/or electrical fields to be put into practice. Any other type of field (electromagnetic or otherwise) which is suitable to activate a cooperable data carrier means in accordance with the present invention can be employed. Thus, in alternative embodiments of the invention for example fields comprising radiation anywhere within the electromagnetic spectrum may be employed, and also other fields such as acoustic or other non-electromagnetic fields may be employed in suitably adapted embodiments.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The preceding description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The embodiments of the invention in which an exclusive property or privilege is claimed are defined as follows:

1. A system for tracking the wearable life of an ophthalmic lens, the system comprising: said ophthalmic lens having thereon or within it at least one sensor for measuring at least one parameter, said sensor having a computer readable medium for storing sensed data and data related to said ophthalmic lens, said data comprising expiration data, said sensor comprising means for emitting said sensed data automatically, or in response to activation by an activating signal applied by an external means; counter means for determine the elapsed time between said time of activation and expiration data, wherein the wearable life of an ophthalmic lens is based on said elapsed time, expiration data and sensed data, wherein said data is related to at least one of a SKU, unique ID, manufacturer, logo, material of manufacture, composition, lot, no., batch no., warehouse related data; promotional material, rebate for next pair purchase or free trials, lens features and benefits data, health warnings, data on potential risk or complications, insurance coverage data, regulatory data, authenticity data, fitting details, lens type data, lens care or handling information, recommended usage information such as wear schedule, filling pharmacy, health professional information, time, an ophthalmic product user's personal details, prescription information, right eye/left eye identification data, URI, lens case replacement schedule, eye exam schedule, eye appointments, and wherein said sensed data is related to at least one of a protein concentration, composition of the lacrimal fluid, fungus, pathogens, viri, bacteria, concentrations of compounds in a lens care product, pH level, eye temperature, eye pressure, eye moisture, oxygen reaching the eye, blink rate, pressure from rubbing, light, frequency of wear, exposure to a lens care product, usage habits, vital signs, pulse rate, geolocation coordinates, chemicals, chemical compounds, acoustic energy, moisture content, humidity, smoke, vibration, radiation, magnetic fields, air quality, power, motion, global positioning, geo-location, orientation, acceleration, or changes thereof.

2. A system for tracking the wearable life of an ophthalmic lens, the system comprising: said ophthalmic lens having thereon or within it at least one sensor for measuring at least one parameter, said sensor having a computer readable medium for storing sensed data and data related to said ophthalmic lens, said data comprising expiration data, said sensor comprising means for emitting said sensed data automatically, or in response to activation by an activating signal applied by an external means; counter means for tracking elapsed time, wherein the wearable life of an ophthalmic lens is based on said elapsed time, said sensed data and expiration data.

3. The system of claim 2 wherein said sensed data is related to at least one of a protein concentration, composition of the lacrimal fluid, fungus, pathogens, viri, bacteria, concentrations of compounds in a lens care product, and pH level.

4. The system of claim 2 wherein said sensed data is related to at least one of a blink rate, pressure from rubbing, and light.

5. The system of claim 2 wherein sensed data is related chemicals, chemical compounds, acoustic energy, humidity, smoke, air quality.

6. The system of claim 2 wherein said at least one sensor is a member of a wireless sensor network.

7. The system of claim 2 wherein said sensed data is related to at least one of a lacrimal fluid content and protein content on said lens, whereby said sensed data triggers an issuance of an advisory signal.

8. The system of claim 7 wherein said sensed data causes an order for a replacement lens to be initiated; and whereby said sensed data is analyzed to determine the frequency of wear of said ophthalmic lens, and said ophthalmic lens care habits of a user.

9. The system of claim 2 wherein said sensed data is related to oxygen measurements to determine the amount of oxygen reaching a cornea of an eye.

10. The system of claim 9 wherein said oxygen measurements are used to create a suitable prescription, including recommendations regarding a particular type of an ophthalmic lens.

11. The system of claim 2 wherein said sensed data is related to at least one of eye temperature, eye pressure, eye moisture and pulse rate measurements, whereby said measurements are analyzed to determine the frequency of wear of said ophthalmic lens, and said ophthalmic lens care habits of a user.

12. The system of claim 2 wherein said sensed data is related to vibration, radiation, magnetic fields, power, motion, global positioning, geo-location, orientation, acceleration, or changes thereof.

13. The system of claim 2 wherein said data is related to at least one of a SKU, unique ID, manufacturer, logo, material of manufacture, composition, lot, no., batch no., warehouse related data; promotional material, rebate for next pair purchase or free trials, lens features and benefits data, health warnings, data on potential risk or complications, insurance coverage data, regulatory data, authenticity data, fitting details, lens type data, lens care or handling information, recommended usage information such as wear schedule, filling pharmacy, health professional information, time, an ophthalmic product user's personal details, prescription information, right eye/left eye identification data, URI, lens case replacement schedule, eye exam schedule, and eye appointments.

14. The system of claim 2 wherein said sensed data provides an indication of the frequency of wear of said ophthalmic lens.

15. The system of claim 14 wherein said sensed data causes an order for a replacement lens to be initiated.

16. The system of claim 2 wherein said computer readable medium comprises instructions executable by a processor to determine when said sensed data associated with said at least one parameter exceeds at least one predetermined threshold and issue an alert.

17. The system of claim 16 wherein said alert is presented on a display.

18. The system of claim 17 wherein said alert is at least one of health warnings, data on potential risk or complications, fitting details, lens care or handling information, recommended usage information such as wear schedule, prescription information, right eye/left eye identification data, lens case replacement schedule, eye exam schedule, and eye appointments.

19. The system of claim 2 wherein said sensed data is analyzed to determine whether a user is in compliance with a prescription, a wear schedule, replacement schedule, or recommended lens care.

20. The system of claim 19 wherein said analyzed sensed data is sent to a third party comprising at least one of a parent, guardian, eye care professional, pharmacy, retailer, store, virtual store and an insurance provider.

* * * * *